March 22, 1949.  C. A. BONVILLIAN ET AL  2,464,791
APPARATUS FOR THE COMBUSTION OF FUEL
Filed Nov. 5, 1943  2 Sheets-Sheet 1
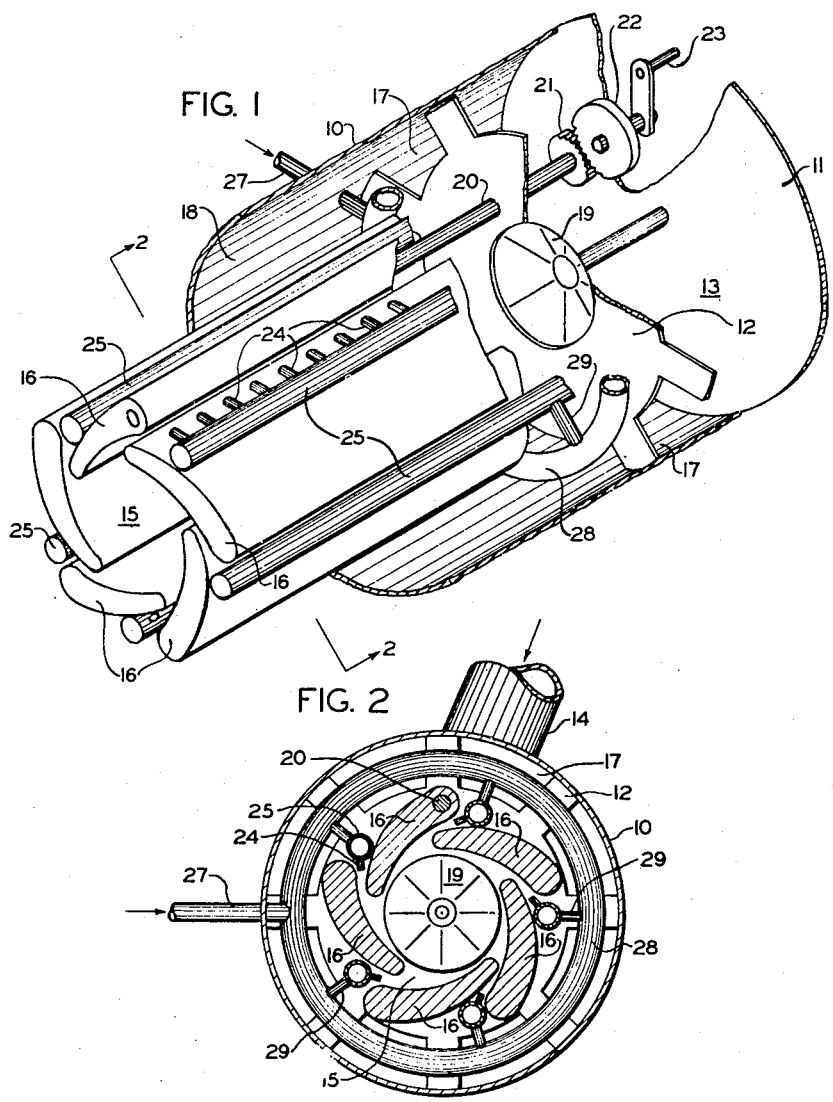

March 22, 1949.  C. A. BONVILLIAN ET AL  2,464,791
APPARATUS FOR THE COMBUSTION OF FUEL
Filed Nov. 5, 1943  2 Sheets-Sheet 2
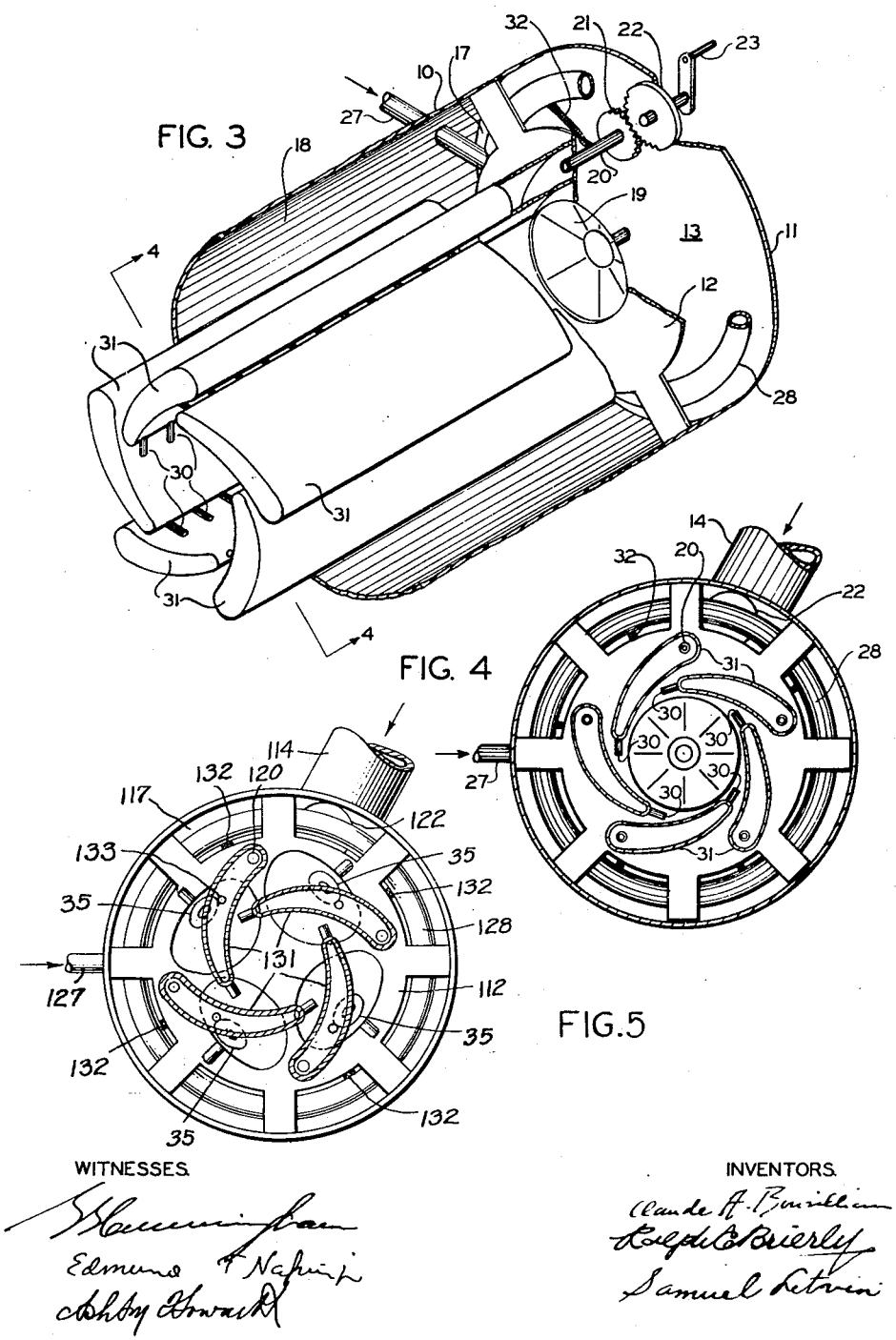
WITNESSES.
INVENTORS.

Patented Mar. 22, 1949

2,464,791

UNITED STATES PATENT OFFICE 2,464,791

APPARATUS FOR THE COMBUSTION OF FUEL

Claude A. Bonvillian, United States Navy, Ralph C. Brierly, Narberth, and Samuel Letvin, Philadelphia, Pa.

Application November 5, 1943, Serial No. 509,080

21 Claims. (Cl. 110—28)

(Granted under the act of March 3, 1883, as amended April 30, 1928; 370 O. G. 757)

This invention pertains to the combustion of fuels.

This application is related to our application, Serial No. 479,010 filed March 13, 1943, for Method and apparatus for the combustion of fuel, in that this application discloses other forms of the inventions disclosed in that application.

The invention provides novel methods of, and apparatus for, the combustion of fuels, preferably at relatively high heat releases, which are applicable to a wide variety of uses, such as gas turbine systems, vapor generators, vapor superheaters, the heating of fluids, and the rocket or jet propulsion of aircraft.

Furnaces embodying the invention preferably have an outer casing and means forming a combustion chamber within, and in spaced relationship to, the outer casing so arranged that secondary air may be supplied to the region surrounding the combustion chamber and delivered therefrom to the chamber to support combustion therein. Fuel and primary air are projected into the combustion chamber and the fuel is ignited therein to form a stream of burning fuel and gases, and the secondary air is delivered to the periphery of the stream in the furnace in such manner that a contracting flame shape is obtained and combustion is completed in the earliest practicable time and in the minimum length of furnace, and a high degree of homogeneity with respect to temperature and constituents of the mixture flowing from the furnace is obtained. By proportioning the air introduced peripherally, the flame shape and the temperature of the gases may be controlled. These results are obtained with minimum pressure drop through the furnace system, and because of the high heat release, in a manner conducive to extreme compactness and light weight, thereby imparting the characteristic of portability to the furnace.

In the forms of the invention disclosed herein, the combustion chamber is bounded by a plurality of members extending parallel to the axis of the chamber and in overlapping relationship, which are movable to vary the extent of the spaces between the members to control the quantity of secondary air delivered to the combustion chamber from the surrounding region. The direction of the flow of air, or any other desired substance, into the combustion chamber, may be controlled further by the use of baffle bars or other means on the outer surfaces of the members bounding the combustion chamber. Substances other than air, such as water, steam, gas, pulverized ore, chemicals or the like, may be delivered into direct contact with the gases in the combustion chamber between the bounding members, or such substances may be delivered to the hollow interiors of these members and ejected therefrom into the combustion chamber as desired, either with or without preheating by the heat of the furnace. This arrangement is useful for contact superheating, contact distillation of chemical substances and contact smelting of pulverized ore, and also is useful for recycling of gases produced in the furnace.

It is entirely practicable to operate furnaces embodying the invention at heat releases on the order of ten million B. t. u. per cu. ft. per hour, and far higher releases are wholly practicable. Moreover, these furnaces possess wide flexibility, so that this heat liberation rate can be varied almost instantaneously through at least a ten to one range, for example, from one to ten million B. t. u. per cu. ft. per hour practically instantly. With furnaces embodying the invention and operating under constant firing conditions at the rates mentioned, it is possible to maintain temperatures of the gases flowing from the furnace within $\pm 25°$ F. of a given figure, and to maintain $CO_2$ percentages within $\pm 0.1\%$, with both substantially uniformly distributed across the exit end of the furnace. With this uniformity, the furnaces can be operated continuously with exit gas temperatures of 2000° F. or more. The invention also permits the use of very high air preheats without jeopardizing the furnace or gas passages as evidenced by the fact that operations frequently have been conducted at air entrance temperatures of 600° F., and available data substantiate the fact that temperatures on the order of 1000° F. can be sustained advantageously. For these reasons, high power can be developed in furnaces of the invention which occupy no more than 2 or 3 cubic feet.

Apparatus embodying the invention requires no firebrick or refractory linings which customarily are employed in furnaces designed for operation at high heat releases in order to sustain combustion through the maintenance of high temperatures and radiant heat effects. In place thereof, heat resistant metal or equivalent material is employed and is cooled by the secondary air supplied to the furnace and by other fluids. The members bounding the combustion chamber preferably are so constructed and arranged that they serve to shape the flame in the desired manner, to promote attainment of the maximum heat release, the maximum combustion speed, and the maximum homogeneity of gases leaving the furnace, not only in regard to temperature but also with respect to constituents. This arrangement is particularly advantageous where lightness of weight is required, and it avoids the erosion that may occur with firebrick or refractory linings with high velocities of air and gas, and which ordinarily results in the entrainment of particles which may have an abrasive action on turbine blading or cause deleterious results in portions of the system beyond the combustion chamber. Moreover, the ejection of incandescent particles of firebrick or refractory would be disadvantageous with aircraft because of the resultant increase in the visibility of the aircraft.

The invention will be understood from the following description when considered in connection with the accompanying drawings forming a part thereof, and in which:

Fig. 1 is an isometric view, with parts in section, of a furnace embodying the invention;

Fig. 2 is a sectional view on line 2—2 of Fig. 1;

Fig. 3 is a view similar to Fig. 1 showing another form of the invention;

Fig. 4 is a sectional view on line 4—4 of Fig. 3, and

Fig. 5 is a view similar to Fig. 4 showing a modified burner arrangement.

Like characters of reference refer to the same ore to similar parts throughout the several views.

Referring to Figs. 1 and 2 of the drawings, the furnace has a cylinder outer casing 10 with a closed end 11 forming with the partition 12, an air chamber 13 to which air is supplied through a conduit 14. The combustion chamber 15 is bounded circumferentially by a plurality of spaced, elongated members 16 of concavo-convex transverse cross-sectional configuration, preferably of air-foil design as shown, with the inner edge portion of each member overlapped by the outer edge portion of the next adjacent member and in spaced relationship thereto. The members 16 may be disposed without overlap, if desired. Secondary air for the combustion chamber flows from the air chamber 13 through openings 17 in the peripheral portion of the partition 12 into the annular space 18 between the casing 10 and the members 16 into the combustion chamber 15. The furnace is fired by a burner 19.

As shown, the quantity of secondary air supplied to the combustion chamber is controlled by varying the extent of the openings between the members 16. To this end, each of the members 16 is mounted on, or is connected to, a rod 20 which extends through the partition 12 and has a bearing in the end member 11 of the casing, and carries a gear 21 fixed thereto which meshes with a gear 22 fixed to a shaft having a hand crank 23. Movement of the cranks 23 in one direction or the other will move the inner ends of the members 16 toward or away from the outer ends of the adjacent members and will increase or decrease the flow areas of the openings between the members. In lieu of individual operating means for the members 16, any suitable means may be employed for actuating the members simultaneously.

Means are provided for the injection into the combustion chamber through the spaces between the members 16 of a suitable substance such as gas, water, steam or chemical. This is accomplished, as shown, by the use of a plurality of nozzles 24 connected to a manifold 25 which extends parallel with and adjacent to the outer edge of each member 16 so that the nozzles are directed into the spaces between the members 16. The substance is supplied to the nozzles 24 through a conduit 27 into a circular distributing manifold 26 to which each manifold 25 is connected through a nipple 29. Water or steam may be injected into the combustion chamber through the nozzles 24 to provide an increased volume of gas to motivate the turbine rotor when the combustion chamber is used in conjunction with a turbine, and to control the temperature of the combustion gases as desired. Natural or other combustible gas may be injected to fire the furnace through the spaces between the members 16 in addition to the burner or burners at the end of the furnace, to augment or to intensify combustion as desired. Mechanical substances or pulverized minerals may be injected through the nozzles 24 simply to introduce them into the stream of hot moving gases for chemical purposes such as precipitation in tanks through which the hot gases are bubbled, or contact smelting such as would be accomplished by the injection of pulverized cinnabar. In the latter case, the mercury and sulphur could be volatilized directly in the gas stream and the dross blown into suitable containers.

In operation, fuel is introduced into the combustion chamber through the burner 19 and primary air is supplied to the burner from the air chamber 13. Secondary air is supplied to the periphery of the fuel and gas stream through the elongated openings between the members 16, and the quantity of secondary air so supplied is controlled by varying the positions of the members 16 relative to each other to change the flow areas of the openings between the members. These openings may all be of equal flow area or they may be of different flow areas as desired. The induction or aspirating effect of the jets 24 will assist or supplement the flow of secondary air into the combustion chamber. With the members 16 arranged and disposed as shown in Figs. 1 and 2, the secondary air will flow into the combustion chamber in a tangential direction and produce a vortex within the chamber.

The embodiment illustrated in Figs. 3 and 4 is substantially the same as the form shown in Figs. 1 and 2 excepting that the substance, such as gas, water, steam or chemical, is ejected into the combustion chamber through nozzles 30 in the inner edge portion of each combustion chamber bounding member 31. The substance is delivered to the bounding members 31 through flexible conduits 32 which connect the annular manifold 26 with the hollow interiors of the members 31 through the tubular members 20. The conduits 32 permit movement of the members 31 individually or simultaneously to adjust and control the quantity of secondary air delivered to the combustion chamber through the openings between the members, in the manner described in connection with Figs. 1 and 2. The operation of this form of the invention is substantially the same as that of Figs. 1 and 2.

In lieu of a single burner for firing the furnace, a plurality of burners may be used, and these may be arranged at the end of the furnace as desired. One suitable arrangement is illustrated in Fig. 5 wherein four burners 35 are employed which are disposed in the partition 117 so as to fire at an angle to the axis of the combustion chamber. The registers and atomizers are set at an angle to each other, as shown, so that the flames from the individual burners are tangential to each other and merge into a spiral. The shape of the spiral flame may be altered by adjustment of the relative positions of the combustion chamber bounding members 131. The burner arrangement shown in Fig. 5 may be used with either of the forms of furnace disclosed herein, but is shown as used with the form shown in Figs. 3 and 4. Parts which correspond to those in the figures just named are identified by the same reference numerals increased by 100.

Furnaces embodying the invention may be lighted off by any suitable means, such as by electrical spark, propane flames, "Glowbars," or other devices.

Preferably, the combustion chamber bounding members are positioned relative to each other so that the quantities of secondary air supplied to the combustion chamber are such that combustion is completed in the earliest practicable time and in the minimum length of furnace, irrespective of high velocities of air, fuel, or both, and so that maximum homogeneity of the gas mixture and maximum progressive heat releases are obtained prior to the passage of the mixture beyond the end of the combustion chamber.

The members 16 or 31 which bound the combustion chamber, preferably are made of high temperature resistant alloy, such for example, as an alloy having 25% chromium and 20% nickel, or an alloy having 60% cobalt, 30% chromium, and 10% molybdenum. The furnace outer casing may be of suitable metal having a lower percentage of constituents providing high heat resistance which may require none of these alloying materials, but is constructed sufficiently heavily to withstand any pressure of the air delivered through them by a compressor or other means.

Any means may be employed for firing the furnaces, other than the burners shown, including atomizers and registers, and more than one such means may be used, and located where desired with respect to the furnace and to each other. Any suitable combustible may be used for fuel for firing the furnace such as oil, pulverized coal, gasoline or gas.

Should the cooling of the furnace present any difficulty, such as may occur with high preheat or with recycling, it may be desirable to employ firing devices for the furnace, or combustibles, or both, which are capable of producing blue flames, thus minimizing radiation, particularly in the initial stages of combustion near the firing end of the furnace. If desired, the combustion chamber bounding members may be plated with suitable metals such as cobalt, rhodium, ruthenium, or the like, and these plated surfaces may be polished on the inner or furnace sides to provide reflecting areas. Liners of similar materials may be employed in the event plating is impractical. By the use of such means, heat absorption of the furnace parts may be decreased materially.

Although in the forms of the invention selected for illustration, the furnace and the combustion chamber are cylindrical, or substantially cylindrical, it will be understood that either the furnace or the combustion chamber, or both, may be square, polygonal, or of any other suitable geometrical cross-sectional configuration. The word "substance" as used in the claims in connection with the introduction of a substance into direct contact with the burning fuel or gases of combustion in the combustion zone, includes within its scope any substance other than air which desirably may be so introduced, including but not limited to gas, water, steam, or a chemical.

The invention disclosed herein may be manufactured and used by or for the Government of the United States for Government purposes without the payment of any royalty thereon or therefor.

It will be understood that changes may be made in the form, location and relative arrangement of the several parts of the furnaces disclosed herein, and changes may be made in the steps or in the sequence of steps of the method disclosed, without departing from the principles of the invention. Accordingly, the invention is not to be limited excepting by the scope of the appended claims.

What we claim is:

1. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, at least one of said members being hollow and having an inlet opening and an outlet opening located to discharge into the combustion chamber.

2. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, at least one of said members being hollow and having an inlet opening and a jet connected with the interior thereof and located to eject into the combustion chamber.

3. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber, and means for projecting a substance which increases the volume of gas flow into the combustion chamber through at least one of said openings including a plurality of jets spaced from one another longitudinally of said opening.

4. Apparatus for the combustion of fuel comprising means forming a combustion chamber, means for projecting fuel and primary air into the chamber wherein the fuel is ignited and burns in a moving stream therein, said means forming the chamber comprising a plurality of members of air-foil transverse cross-sectional configuration and having peripheries extending substantially parallel to the axis of the chamber and in spaced relationship to each other to provide openings between them at the periphery of the burning fuel stream, means for introducing secondary air into the chamber, and means for projecting a substance which increases the volume of gas flow into the combustion chamber through at least one of said openings including a plurality of jets spaced from one another longitudinally of said opening.

5. Apparatus for the combustion of fuel comprising means forming a combustion chamber, means for projecting fuel and primary air into the chamber wherein the fuel is ignited and burns in a moving stream therein, said means forming the chamber comprising a plurality of members of concavo-convex air-foil transverse cross-sectional configuration and having peripheries extending substantially parallel to the axis of the chamber and in spaced relationship to each other to provide openings between them at the periphery of the burning fuel stream, means for introducing secondary air into the chamber through said openings, and means for projecting a substance which increases the volume of gas flow into the combustion chamber through at least one of said openings including a manifold extending longitudinally of said opening, the manifold having a plurality of outlets spaced from one another longitudinally thereof through which jets of said substance are delivered into the combustion chamber.

6. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, said members being disposed in overlapping relationship, means for introducing secondary air into the chamber through said openings, and means for projecting a substance which increases the volume of gas flow into the combustion chamber through at least one of said openings including a manifold extending longitudinally of said opening, the manifold having a plurality of outlets spaced from one aonther longitudinally thereof through which jets of said substance are delivered into the combustion chamber.

7. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, means for moving at least one of said members with respect to an adjacent member to vary the flow area of the opening between them to vary the quantity of secondary air supplied to the chamber through said opening, and means for projecting a substance which increases the volume of gas flow into the combustion chamber through at least one of said openings including a plurality of jets spaced from one another longitudinally of said opening.

8. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, means for moving each of said members with respect to an adjacent member to vary the flow areas of the openings between the members to vary the quantity of secondary air supplied to the chamber through said openings, and means for projecting a substance which increases the volume of gas flow into the combustion chamber through each of said openings including a manifold extending longitudinally of said openings, the manifold having a plurality of outlets spaced from one another longitudinally thereof through which jets of said substance are delivered into the combustion chamber.

9. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, and means for projecting a combustible substance into the combustion chamber through at least one of said openings including a manifold extending longitudinally of said opening, the manifold having a plurality of nozzles spaced from one another longitudinally thereof through which jets of said substance are delivered into the combustion chamber.

10. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, at least one of said members being hollow and having an inlet opening and means including a plurality of outlets spaced from one another longitudinally of said members and located to discharge from said member into the combustion chamber.

11. Apparatus for the combustion of fuel comprising means forming a combustion chamber, means for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, at least one of said members being hollow and having an inlet opening and a plurality of jets on the periphery of said member adjacent the burning fuel stream, said jets being spaced from one another longitudinally of said member and being connected with the interior thereof to eject from said member into the combustion chamber.

12. Apparatus for the combustion of fuel comprising means forming a combustion chamber, a plurality of fuel burners having registers for projecting fuel and primary air into the chamber wherein the fuel is ignited and burns in a moving stream therein, said means forming the chamber comprising a plurality of members having peripheries extending substantially parallel to the axis of the chamber and in spaced relationship to each other to provide openings between them at the periphery of the burning fuel stream, means for introducing secondary air into the chamber through said openings, the burners and their registers being so disposed with respect to each other that the flames therefrom merge into a spiral, and means for projecting a substance which increases the volume of gas flow into the combustion chamber through at least one of said openings including a plurality of jets spaced from one another longitudinally of said opening.

13. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members of concavo-convex cross-sectional configuration of substantially air-foil design, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition and means providing a conduit between the manifold and the combustion chamber adjacent the longitudinal edges of said members.

14. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members of concave-convex cross-sectional configuration of substantially air-foil design, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, and means providing a conduit through which a substance is introduced into the combustion chamber adjacent the longitudinal edges of said members.

15. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members of concave-convex cross-sectional configuration of substantially air-foil design, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, and means for moving said members to vary the flow areas of the openings between the members to regulate the quantity of air flowing from the secondary air chamber into the combustion chamber.

16. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition, and means providing a conduit between the manifold and the combustion chamber adjacent the longitudinal edges of said members.

17. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, and means providing a conduit through which a substance is introduced into the combustion chamber adjacent the longitudinal edges of said members.

18. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members of concavo-convex cross-sectional configuration of substantially air-foil design, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition, and other manifolds connected to the distributing manifold and disposed adjacent the longitudinal edges of said members, said other manifolds having a plurality of nozzles located so as to discharge into the combustion chamber through the spaces between said members.

19. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition, and other manifolds connected to the distributing manifold and disposed adjacent the longitudinal edges of said members, said other manifolds having a plurality of nozzles located so as to discharge into the combustion chamber through the spaces between said members.

20. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members of concavo-convex cross-sectional configuration of substantially air-foil design, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition, said members being hollow and having a plurality of nozzles connecting with the interiors of the members along an edge portion of each member and discharging into the combustion chamber, and means for connecting the interiors of the members with the distributing manifold.

21. Apparatus for the combustion of fuel comprising a tubular casing closed at one end, a transverse partition in the casing spaced from the closed end thereof to provide an air chamber to which air is supplied, means in the casing forming a combustion chamber, said means comprising a plurality of spaced, elongated members, a burner operatively associated with said partition for projecting fuel and primary air into the combustion chamber, said members being spaced from the inner wall of the tubular casing to provide between said members and wall a secondary air chamber, said partition having openings through which air flows from the air chamber to the secondary air chamber and through the openings between said members into the combustion chamber, means for moving said members to vary the flow areas of the openings between the members to regulate the quantity of air flowing from the secondary air chamber into the combustion chamber, a distributing manifold in the casing adjacent said partition, said members being hollow and having a plurality of nozzles connecting with the interiors of the members along an edge portion of each member and discharging into the combustion chamber, and means for connecting the interiors of the members with the distributing manifold.

CLAUDE A. BONVILLIAN.
RALPH C. BRIERLY.
SAMUEL LETVIN.

REFERENCES CITED

The following references are of record in the file of this patent:

UNITED STATES PATENTS

| Number | Name | Date |
|---|---|---|
| 836,145 | Shutz | Nov. 20, 1906 |
| 854,798 | Bunce | May 28, 1907 |
| 1,086,712 | Irish | Feb. 10, 1914 |
| 1,450,229 | Robinson | Apr. 3, 1923 |
| 1,476,994 | Meyer et al. | Dec. 11, 1923 |
| 1,508,718 | Peabody | Sept. 16, 1924 |
| 1,618,808 | Burg | Feb. 22, 1927 |
| 1,630,509 | Adams | May 31, 1927 |
| 1,777,411 | Mayr | Oct. 7, 1930 |
| 1,795,454 | Van Brunt | Mar. 10, 1931 |
| 1,801,431 | Irish | Apr. 21, 1931 |
| 1,943,286 | Burg | Jan. 16, 1934 |
| 1,946,011 | Burg | Feb. 6, 1934 |
| 1,980,266 | Goddard | Nov. 13, 1934 |
| 2,097,255 | Saha | Oct. 26, 1937 |

FOREIGN PATENTS

| Number | Country | Date |
|---|---|---|
| 277,543 | Great Britain | Sept. 22, 1927 |